(12) United States Patent
Kim

(10) Patent No.: US 6,255,016 B1
(45) Date of Patent: Jul. 3, 2001

(54) SECONDARY BATTERY

(75) Inventor: Sang-Kwon Kim, Chonan (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/255,096

(22) Filed: Feb. 22, 1999

(30) Foreign Application Priority Data

Aug. 24, 1998 (KR) .................................................. 98-34206

(51) Int. Cl.⁷ .................................................. H01M 2/08
(52) U.S. Cl. .......................... 429/174; 429/61; 429/175; 429/185
(58) Field of Search .............................. 429/174, 61, 175, 429/185

(56) References Cited

U.S. PATENT DOCUMENTS

| 4,401,733 | * | 8/1983 | Shirai et al. | 429/174 |
| 4,521,500 | * | 6/1985 | Watanabe | 429/174 |
| 5,306,582 | * | 4/1994 | Tanaka | 429/185 |

FOREIGN PATENT DOCUMENTS

| 022527 | * | 2/1979 | (JP) | 429/174 |
| 017855 | * | 1/1985 | (JP) | 429/174 |

* cited by examiner

Primary Examiner—John S. Maples
(74) Attorney, Agent, or Firm—Baker & McKenzie

(57) ABSTRACT

A battery includes a can filled with an electrode assembly and an electrolyte, a cap assembly mounted on an upper end of the can, a gasket disposed between the can and the cap assembly to prevent the electrolyte from leaking, and a seal reinforcing member disposed between the gasket and the cap assembly. The seal reinforcing member is made of a material which forms a tight seal with a material forming the gasket.

11 Claims, 2 Drawing Sheets

SECONDARY BATTERY

BACKGROUND OF THE INVENTION

1. Field of the Invention

The present invention relates to a secondary battery and, more particularly, to a secondary battery that is structured to improve a seal effect between a cap assembly and a can to prevent electrolyte from leaking out of the battery while providing safety and reliability to the battery.

2. Description of the Prior Art

Generally, secondary batteries are compact in size and rechargeable, while providing a large capacity. Well known as secondary batteries are a Nickel metal hydride battery, a Lithium(Li) battery, and a Li-ion battery.

Particularly, the Li-ion battery uses lithium metal oxide as a positive active material and carbon or a carbon compound as a negative active material. Lithium salt dissolved in an organic solvent is used as the electrolyte via which the lithium ions move between positive and negative electrodes. Charging and discharging operations are realized while the lithium ions are moved between positive and negative electrodes.

FIG. 4 shows a conventional Li-ion battery.

A roll electrode assembly 2 is inserted into a can 4 filled with electrolyte, the roll electrode assembly 2 consisting of positive and negative electrodes and a separator disposed between the positive and negative electrodes. Mounted on an upper end of the can 4 is a cap assembly 6.

The cap assembly 6 is insulated from the can 4 by an intermediate gasket 8. That is, the upper end of the can 4 is crimped on an outer periphery of the cap assembly 6 with the gasket 8 interposed therebetween.

The cap assembly 6 comprises a safety plate 14 provided with a safety groove, a current control member 12 disposed on the safety plate 14, and a cap cover 10 disposed on the current control member 12. Attached under the safety valve 14 is a circuit breaker 18 with an insulator 16 disposed therebetween. The circuit breaker 18 is welded on a positive tab 20 so that it is coupled to a positive electrode of the electrode assembly 2.

In the conventional Li-ion battery structured as in the above, to enhance a seal effect between the cap assembly 6 and the can 4, tar 22 is deposited between the gasket 8 and the cap assembly 6. However, because of a chemical reaction between the electrolyte and the tar 22, the tar 22 may melt, deteriorating the seal effect.

SUMMARY OF THE INVENTION

The present invention has been made in an effort to solve the above described problems.

It is an objective of the present invention to provide a secondary battery that is structured to improve a seal effect between a cap assembly and a can to prevent electrolyte from leaking out of the battery while providing safety and reliability to the battery.

To achieve the above objective, the present invention provides a battery which comprises a can filled with an electrode assembly and an electrolyte, a cap assembly mounted on an upper end of the can, a gasket disposed between the can and the cap assembly to prevent the electrolyte from leaking, and a seal reinforcing member disposed between the gasket and the cap assembly.

The seal reinforcing member is made of a material which forms a tight seal with a material forming the gasket.

Preferably, the seal reinforcing member comprises a polymer coated around an outer circumference of the cap assembly.

The cap assembly comprises a cap cover, a current control member disposed under the cap cover, and a plate provided with a safety groove and disposed under the current control member, and the seal reinforcing member is formed around at least one outer circumference of the cap cover, the current control member and the plate.

Preferably, the seal reinforcing member is made of a polymer material selected from the group consisting of fluoride, polyimide, polytetrafluoroethylene, polyethylene, and polypropylene.

More preferably, the seal reinforcing member extends to an edge of the upper surface of the cap cover and to an edge of the lower surface of the current control member.

The battery may further comprises a current breaker disposed under the plate with an insulator in between. The current breaker is attached to a center of the plate.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENT

Reference will now be made in detail to the present preferred embodiment of the invention, an example of which is illustrated in the accompanying drawings. Wherever possible, the same reference numbers will be used throughout the drawings to refer the same or like parts.

Figure 1:
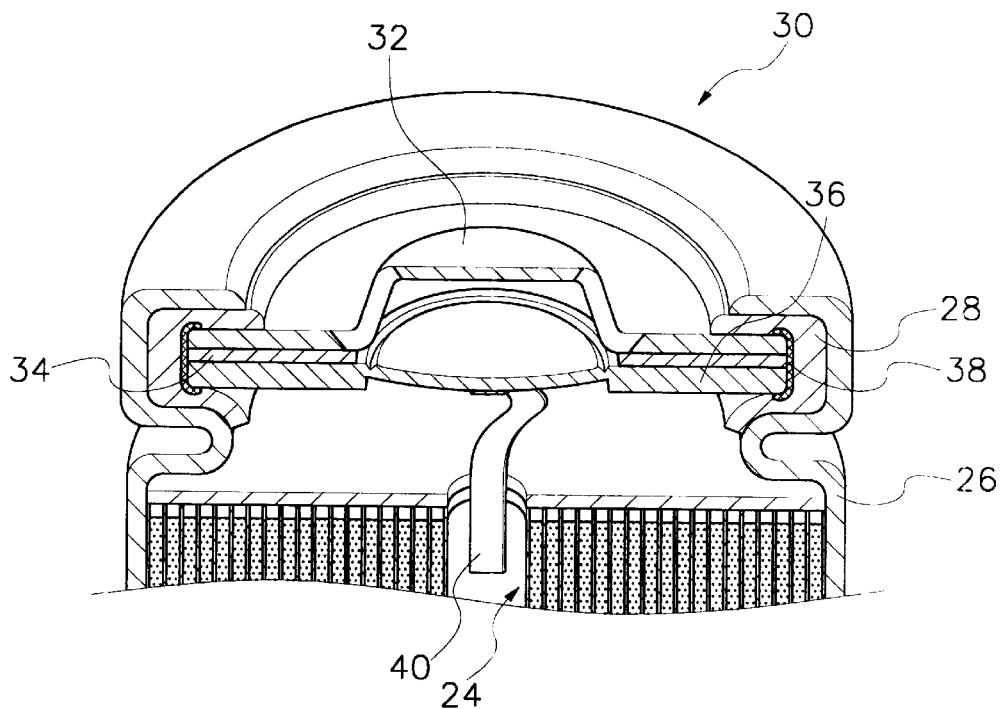
FIG. 1 is a perspective, partly in section, view illustrating a secondary battery according to a first preferred embodiment of the present invention is employed.

Referring first to FIG. 1, there is shown a secondary battery according to a first preferred embodiment of the present invention.

A roll electrode assembly 24 is received within a can 26. A cap assembly 30 is mounted on an upper end of the can 26 with an insulating gasket 28 disposed therebetween. The gasket 28 is generally made of a polymer material.

The cap assembly 30 comprises a cap cover 32, a current control member 34 disposed under the cap cover 32, and a plate 36 provided with a safety groove and disposed under the current control member 34.

To enhance a seal effect between the cap assembly 30 and the can 26, a seal reinforcing member 38 is provided between the cap assembly 30 and the gasket 28. As the seal reinforcing member 38, in this embodiment, a polymer material is coated on the circumferential side of the cap assembly 30 defined by the circumferential sides of the cap cover 32, the current control member 34 and the plate 36.

The polymer coating is performed before the cap assembly 30 is installed in the can 26. Needless to say the coating provides far superior bonding to the circumferential sides of the cap cover 32, current control member 34 and plate 36 than a conventional method of physically applying force a gasket against the circumferential sides only be crimping.

Now according to the present invention the gasket 28 is placed around the coated circumferential sides before the upper portion of the can 26 is crimped. Unlike prior arts, the gasket 28 is pressed against the coating, made of a material similar to the gasket 28 itself and thus the contact surfaces are somewhat integrated resulting in much more tighter seal than in conventional designs.

Preferably, the polymer 38 coated on the outer circumference of the cap assembly 30 is selected from a material similar to that used for the insulating gasket 28. For example, the material is selected from the group consisting of fluoride, polyimide, polytetrafluoroethylene, polyethylene, and poly propylene.

Figure 2:
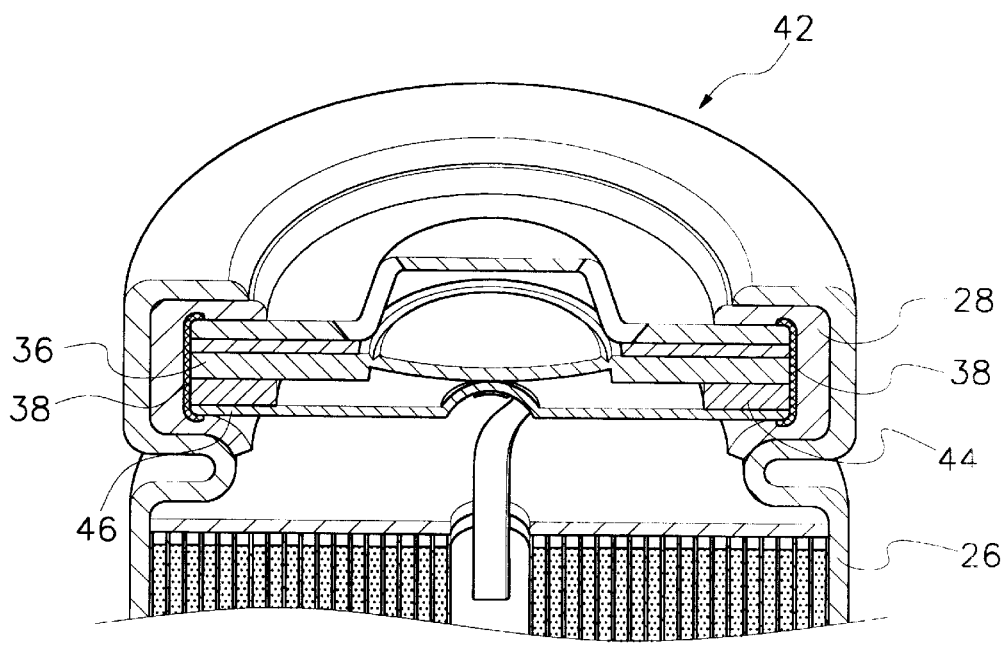
FIG. 2 is a perspective, partly in section, view illustrating a secondary battery according to a second preferred embodiment of the present invention.

FIG. 2 shows a secondary battery according to a second preferred embodiment of the present invention.

The structure of the secondary battery of this embodiment is identical to that of the first embodiment except that a current breaker 46 is additionally disposed under the plate 36 with an insulator 44 in between. The current breaker 46 is welded to a center of the plate 36.

In this embodiment, an outer circumferential side of a cap assembly 42 further includes circumferential sides of the insulator 44, and the current breaker 46.

Now the outer circumferential side is coated with a polymer 38 as the seal reinforcing member. The outer circumference of the cap assembly 42 is crimped at the upper end of the can 26 with the gasket 28 disposed therebetween.

Figure 3:
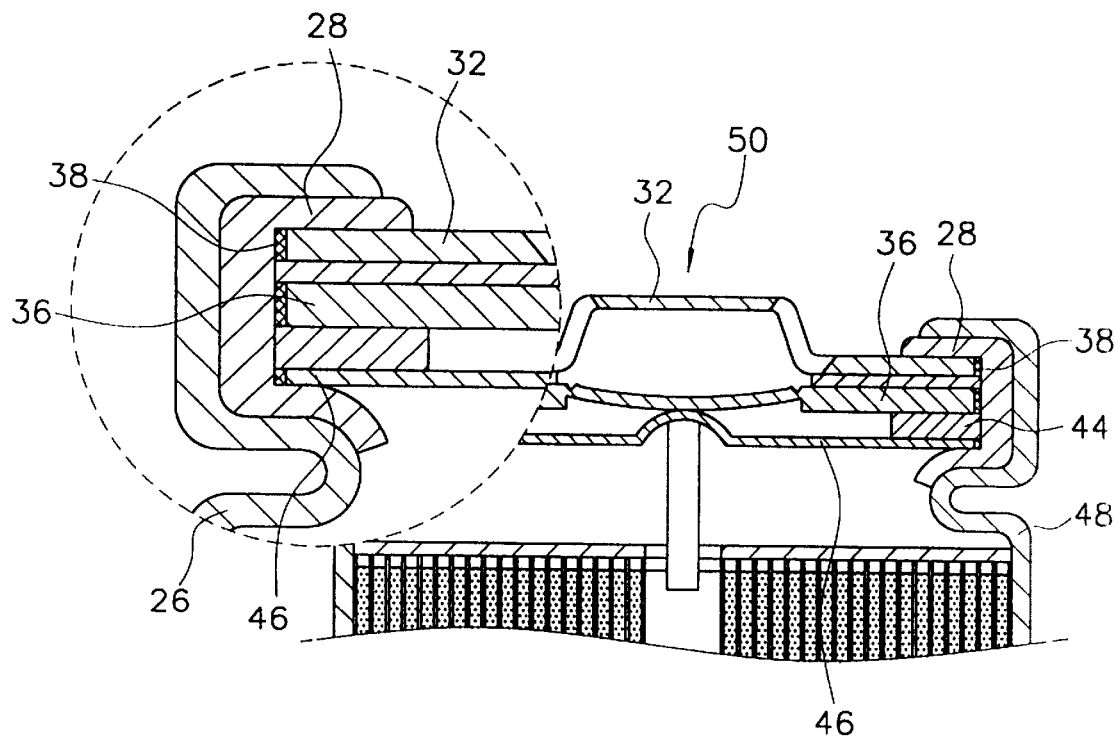
FIG. 3 is a sectional view illustrating a secondary battery according to a third preferred embodiment of the present invention.
Figure 4:
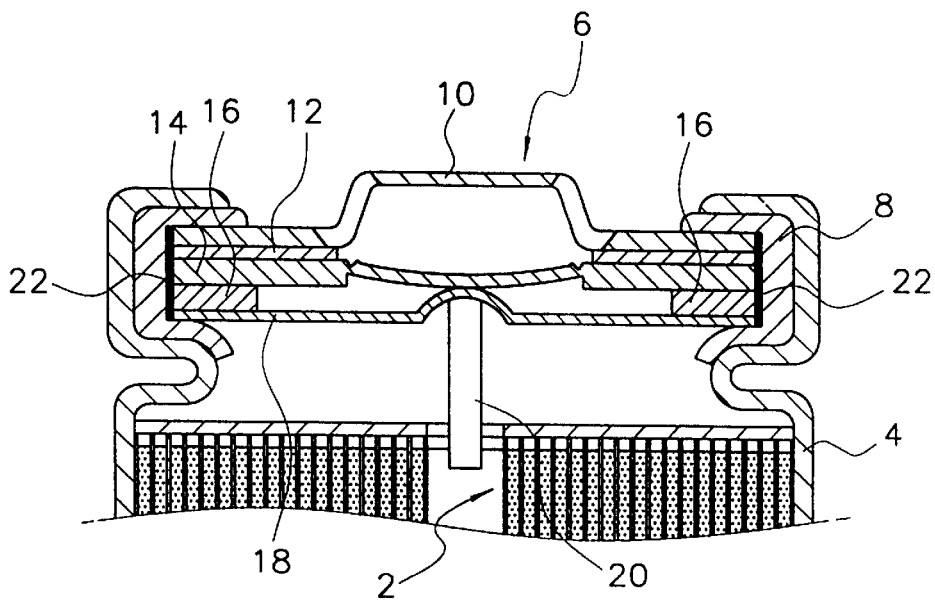
FIG. 4 is a sectional view of a conventional battery.

FIG. 3 shows a secondary battery according to a third embodiment of the present invention.

In the above first and second embodiments, the circumferential sides of the cap cover, current control member, plate, insulator and current breaker are coated with the polymer simultaneously in the assembled state.

However, in the third embodiment, the circumferential sides of the cap cover, current control member, plate, insulator and current breaker are independently coated with a polymer 38 before assembled.

Preferably, in this embodiment, the cap cover 32, the plate 36 and the current breaker 46 which are made of a metal material are independently coated at their outer circumferences with the polymer 38.

As described in the above embodiments, since the outer circumference of the cap assembly is coated with the polymer of the same material as a gasket, against which the cap assembly is pressed, the seal of the battery is enhanced as the same materials tightly contact each other when the upper end of the can 26 is crimped around the cap assembly.

More preferably, as shown in FIGS. 1 and 2, the polymer can be coated to extend to edges of the upper surface of the cap cover and the lower surface of the current control member (in FIG. 1) or the circuit breaker (in FIG. 2), which contact the gasket 28, to further increase the seal effect of the battery.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A battery comprising:
a can filled with an electrode assembly and an electrolyte;
a cap assembly mounted on an upper end of the can;
a gasket disposed between the can and the cap assembly to prevent the electrolyte from leaking; and
a seal reinforcing member disposed between the gasket and the cap assembly, the seal reinforcing member being made of a polymer which forms a tight seal with a material forming the gasket;
wherein the cap assembly comprises a cap cover, a current control member disposed under the cap cover, and a plate provided with a safety groove and disposed under the current control member.

2. A batter comprising:
a can filled with an electrode assembly and an electrolyte:
a cap assembly mounted on an upper end of the can;
a gasket disposed between the can and the cap assembly to prevent the electrolyte from leaking; and
a seal reinforcing member disposed between the gasket and the cap assembly, the seal reinforcing member being made of a polymer which forms a tight seal with a material forming the gasket,
wherein the cap assembly comprises a cap cover, a current control member disposed under the cap cover, and a plate provided with a safety groove and disposed under the current control member, and
wherein the seal reinforcing member is coated around at least one outer circumference of the cap cover, the current control member and the plate.

3. A battery comprising:
a can filled with an electrode assembly and an electrolyte;
a cap assembly mounted on an upper end of the can;
a gasket disposed between the can and the cap assembly to prevent the electrolyte from leaking; and
a seal reinforcing member disposed between the gasket and the cap assembly, the seal reinforcing member being made of a polymer which forms a tight seal with a material forming the gasket,
wherein the seal reinforcing member is made of a polymer material selected from the group consisting of fluoride, polyimide, polytetrafluoroethylene, polyethylene, and polypropylene.

4. A battery comprising:
a can filled with an electrode assembly and an electrolyte;
a cap assembly mounted on an upper end of the can;
a gasket disposed between the can and the cap assembly to prevent the electrolyte from leaking; and
a seal reinforcing member disposed between the gasket and the cap assembly, the seal reinforcing member being made of a polymer which forms a tight seal with a material forming the gasket,
wherein the cap assembly comprises a cap cover, a current control member disposed under the cap cover, and a plate provided with a safety groove and disposed under the current control member, and
wherein the seal reinforcing member is coated around an outer circumference of the cap assembly which is defined by outer circumferences of the cap cover, the current control member and the plate.

5. The battery of claim 4 wherein the seal reinforcing member extends to an edge of an upper surface of the cap cover and to an edge of a lower surface of the current control member.

6. The battery of claim 4 wherein the seal reinforcing member is made of a polymer material selected from the group consisting of fluoride, polyimide, polytetrafluoroethylene, polyethylene, and polypropylene.

7. A battery comprising:
   a can filled with an electrode assembly and an electrolyte;
   a cap assembly mounted on an upper end of the can;
   a gasket disposed between the can and the cap assembly to prevent the electrolyte from leaking;
   a seal reinforcing member disposed between the gasket and the cap assembly, the seal reinforcing member being made of a polymer which forms a tight seal with a material forming the gasket; and
   an insulator disposed under the plate, and a current breaker is disposed under the insulator and attached to a center of the plate,
   wherein the seal reinforcing member is coated around at least one outer circumference of the cap cover, the current control member and the plate.

8. The battery of claim 7 wherein the seal reinforcing member is coated around at least one outer circumference of the cap cover, the current control member, the plate, the insulator, and the current breaker.

9. The battery of claim 7 wherein the seal reinforcing member is coated around an outer circumference of the cap assembly which is defined by outer circumferences of the cap cover, the current control member, the plate, the insulator, and the current breaker.

10. The battery of claim 7 wherein the seal reinforcing member extends to an edge of an upper surface of the cap cover and to an edge of a lower surface of the current control member.

11. The battery of claim 7 wherein the seal reinforcing member is made of a polymer material selected from the group consisting of fluoride, polyimide, polytetrafluoroethylene, polyethylene, and polypropylene.

* * * * *